US012639530B2

(12) United States Patent
Greene et al.

(10) Patent No.: US 12,639,530 B2
(45) Date of Patent: May 26, 2026

(54) SYSTEMS AND METHODS FOR A CONVERSATIONAL ASSISTANT USING ARTIFICIAL INTELLIGENCE IN A FREIGHT MANAGEMENT PLATFORM

(71) Applicant: Internet Truckstop Group LLC, Boise, ID (US)

(72) Inventors: Jeremy Greene, Mission Viejo, CA (US); Pete Lunenfeld, Thousand Oaks, CA (US); Shashank Kapoor, Mundelein, IL (US)

(73) Assignee: Internet Truckstop Group LLC, Boise, ID (US)

( * ) Notice: Subject to any disclaimer, the term of this patent is extended or adjusted under 35 U.S.C. 154(b) by 175 days.

(21) Appl. No.: 18/519,305

(22) Filed: Nov. 27, 2023

(65) Prior Publication Data

US 2025/0173514 A1     May 29, 2025

(51) Int. Cl.
*G06F 40/40* (2020.01)
*G06Q 10/087* (2023.01)

(52) U.S. Cl.
CPC ........... *G06F 40/40* (2020.01); *G06Q 10/087* (2013.01)

(58) Field of Classification Search
CPC ... G10L 15/1815; G10L 15/183; G10L 15/22; G10L 25/66; G06N 20/00; G06N 3/045; G06N 3/08; G06F 40/40; G06F 40/30; G06F 40/20; G06Q 50/01; G06Q 30/0631; G06Q 10/087; G06Q 40/08; G06Q 30/0271; G06Q 30/0617; G06Q 10/0833; G06Q 10/083; G06Q 30/04
See application file for complete search history.

(56) References Cited

U.S. PATENT DOCUMENTS

| | | | | |
|---|---|---|---|---|
| 8,725,656 | B1 * | 5/2014 | Gill ...................... | G06Q 10/101 |
| | | | | 705/331 |
| 11,977,821 | B1 * | 5/2024 | Marsh ..................... | G06F 30/13 |
| 2012/0143733 | A1 * | 6/2012 | Kappauf ................ | G06Q 30/04 |
| | | | | 705/34 |
| 2019/0244170 | A1 * | 8/2019 | Brownell ........... | G06Q 10/0832 |
| 2019/0385119 | A1 * | 12/2019 | Chang ................ | G06Q 10/0833 |
| 2021/0042705 | A1 * | 2/2021 | Suen .................. | G06Q 10/0838 |
| 2022/0126864 | A1 * | 4/2022 | Moustafa .................. | G06T 9/00 |
| 2022/0156823 | A1 * | 5/2022 | Tremblay ................ | G06F 40/20 |

(Continued)

*Primary Examiner* — Jakieda R Jackson

(74) *Attorney, Agent, or Firm* — Aambell PC

(57) ABSTRACT

Embodiments of a method for implementing a conversational assistant in a freight management platform comprises receiving a user query related to a carrier in natural language from a conversational interface; selecting a data repository according to a classification of the user query into a topic related to freight management, different topics being associated with respective datasets; querying the selected data repository using a carrier identifier identifying the carrier; retrieving from the selected data repository, the respective dataset associated with the carrier identifier; receiving a prompt with instructions to a large language model (LLM) to answer the user query based on a selected persona, a chosen tone, and the retrieved dataset; passing the prompt including the retrieved dataset to the LLM; receiving a response from the LLM to the prompt, the response being based on data in the retrieved dataset; and providing the response to the conversational interface.

20 Claims, 10 Drawing Sheets

(56)         References Cited

U.S. PATENT DOCUMENTS

| | | | |
|---|---|---|---|
| 2022/0301031 A1* | 9/2022 | Iyer | G06Q 30/0623 |
| 2023/0403357 A1* | 12/2023 | Ezell | G10L 15/26 |
| 2024/0045990 A1* | 2/2024 | Boyer | G06F 21/6245 |
| 2024/0281753 A1* | 8/2024 | Dzugan | G06Q 10/0838 |
| 2024/0311922 A1* | 9/2024 | Fields | G09B 5/06 |
| 2024/0331043 A1* | 10/2024 | Williams | G06N 3/08 |
| 2024/0354555 A1* | 10/2024 | Knipfing | G06N 3/0455 |
| 2024/0394593 A1* | 11/2024 | Gutierrez | G06N 5/022 |
| 2024/0404514 A1* | 12/2024 | Rollwage | A61B 5/4803 |
| 2024/0412030 A1* | 12/2024 | Guinn | G06N 3/045 |
| 2025/0022071 A1* | 1/2025 | Gutierrez | G06Q 50/01 |
| 2025/0028579 A1* | 1/2025 | Mehmeri | H04L 51/02 |
| 2025/0061491 A1* | 2/2025 | Ahmad-Taylor | |
| | | | G06Q 30/0271 |
| 2025/0111147 A1* | 4/2025 | Pryzant | G06F 40/56 |
| 2025/0148218 A1* | 5/2025 | Gusarov | G06T 19/006 |
| 2025/0148816 A1* | 5/2025 | Gusarov | G06V 20/70 |
| 2025/0150414 A1* | 5/2025 | Mikhailiuk | H04L 51/063 |

* cited by examiner

100

104

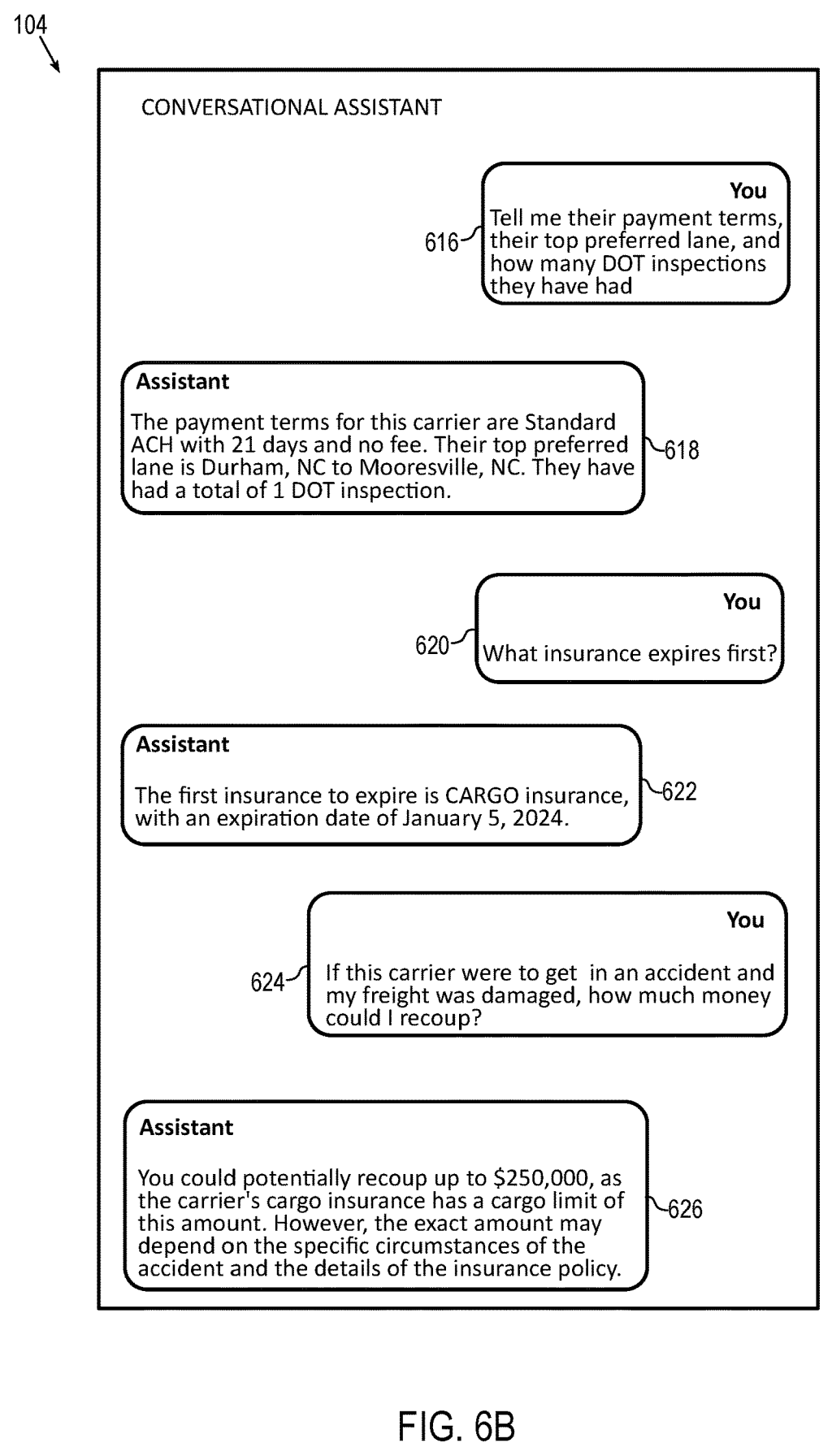

104

CONVERSATIONAL ASSISTANT

You
616 — Tell me their payment terms, their top preferred lane, and how many DOT inspections they have had

Assistant
The payment terms for this carrier are Standard ACH with 21 days and no fee. Their top preferred lane is Durham, NC to Mooresville, NC. They have had a total of 1 DOT inspection. — 618

You
620 — What insurance expires first?

Assistant
The first insurance to expire is CARGO insurance, with an expiration date of January 5, 2024. — 622

You
624 — If this carrier were to get in an accident and my freight was damaged, how much money could I recoup?

Assistant
You could potentially recoup up to $250,000, as the carrier's cargo insurance has a cargo limit of this amount. However, the exact amount may depend on the specific circumstances of the accident and the details of the insurance policy. — 626

FIG. 6B

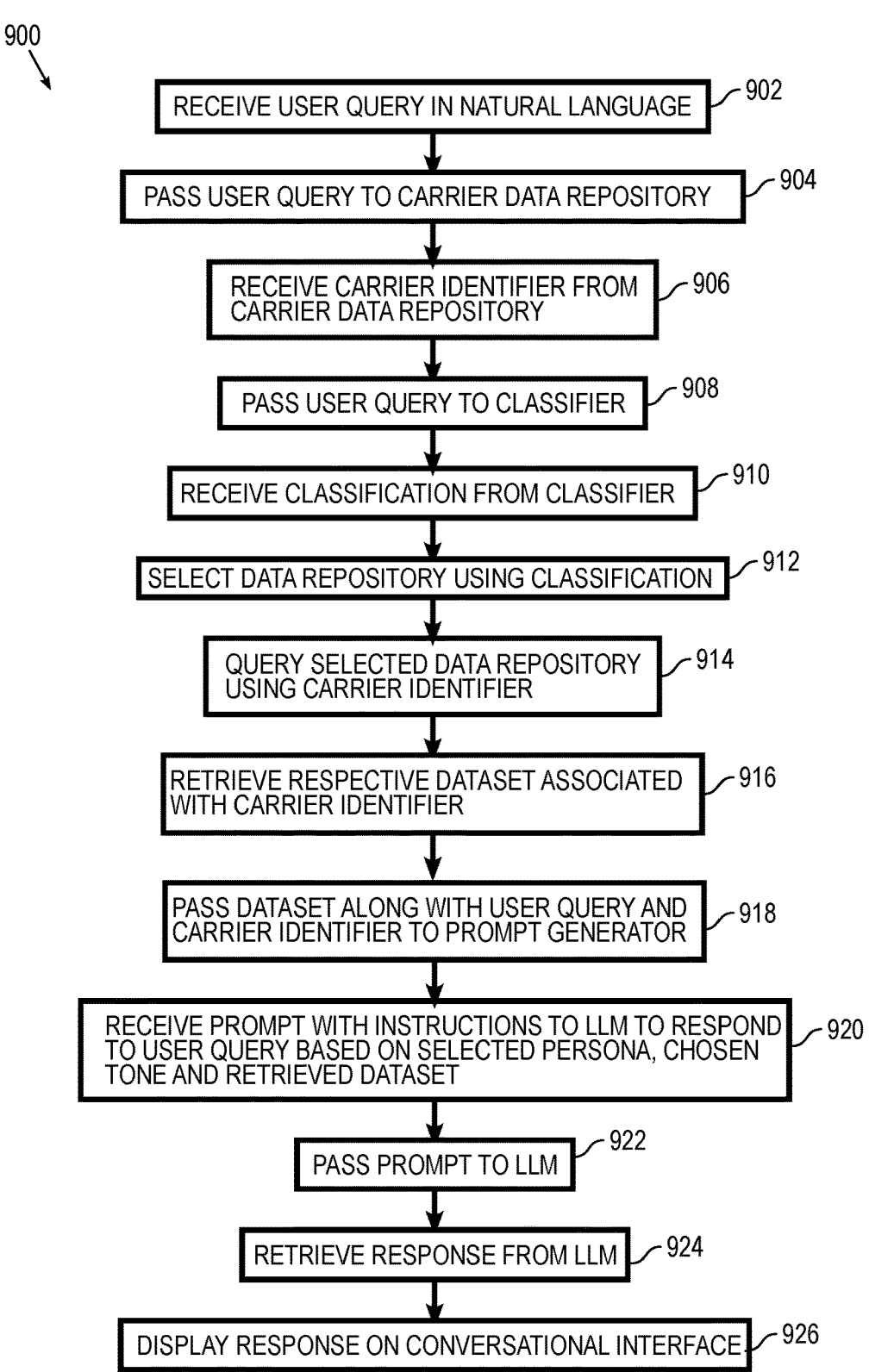

900

RECEIVE USER QUERY IN NATURAL LANGUAGE ⌐902

PASS USER QUERY TO CARRIER DATA REPOSITORY ⌐904

RECEIVE CARRIER IDENTIFIER FROM CARRIER DATA REPOSITORY ⌐906

PASS USER QUERY TO CLASSIFIER ⌐908

RECEIVE CLASSIFICATION FROM CLASSIFIER ⌐910

SELECT DATA REPOSITORY USING CLASSIFICATION ⌐912

QUERY SELECTED DATA REPOSITORY USING CARRIER IDENTIFIER ⌐914

RETRIEVE RESPECTIVE DATASET ASSOCIATED WITH CARRIER IDENTIFIER ⌐916

PASS DATASET ALONG WITH USER QUERY AND CARRIER IDENTIFIER TO PROMPT GENERATOR ⌐918

RECEIVE PROMPT WITH INSTRUCTIONS TO LLM TO RESPOND TO USER QUERY BASED ON SELECTED PERSONA, CHOSEN TONE AND RETRIEVED DATASET ⌐920

PASS PROMPT TO LLM ⌐922

RETRIEVE RESPONSE FROM LLM ⌐924

DISPLAY RESPONSE ON CONVERSATIONAL INTERFACE ⌐926

FIG. 9

SYSTEMS AND METHODS FOR A CONVERSATIONAL ASSISTANT USING ARTIFICIAL INTELLIGENCE IN A FREIGHT MANAGEMENT PLATFORM

TECHNICAL FIELD

The present disclosure relates to systems, techniques, and methods directed to a conversational assistant using artificial intelligence (AI) in a freight management platform.

BACKGROUND

A freight management platform in the context of the transportation and logistics industry can include an online freight marketplace where shippers and carriers can connect to arrange for transportation of freight. In such marketplaces, a loadboard facilitates matching of available freight with available carrier capacity, helping to streamline the process of finding and booking shipments for transportation. The loadboard serves as a digital marketplace where shippers and brokers can post their available freight loads, and carriers can search and bid on those loads for transportation. Similarly, carriers can also post their available truck capacity, and shippers and brokers can search for carriers to transport their goods. Loadboards often include real-time load tracking, communication tools, and payment processing, helping to streamline the process of arranging transportation and managing freight shipments.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

FIGS. 6A and 6B are simplified diagrams illustrating other example details of the freight management platform with a conversational assistant using AI, according to some embodiments of the present disclosure.

FIG. 9 is a simplified flow diagram illustrating other example operations associated with the freight management platform with a conversational assistant using AI, according to some embodiments of the present disclosure.

DETAILED DESCRIPTION

Overview

Figure 1:
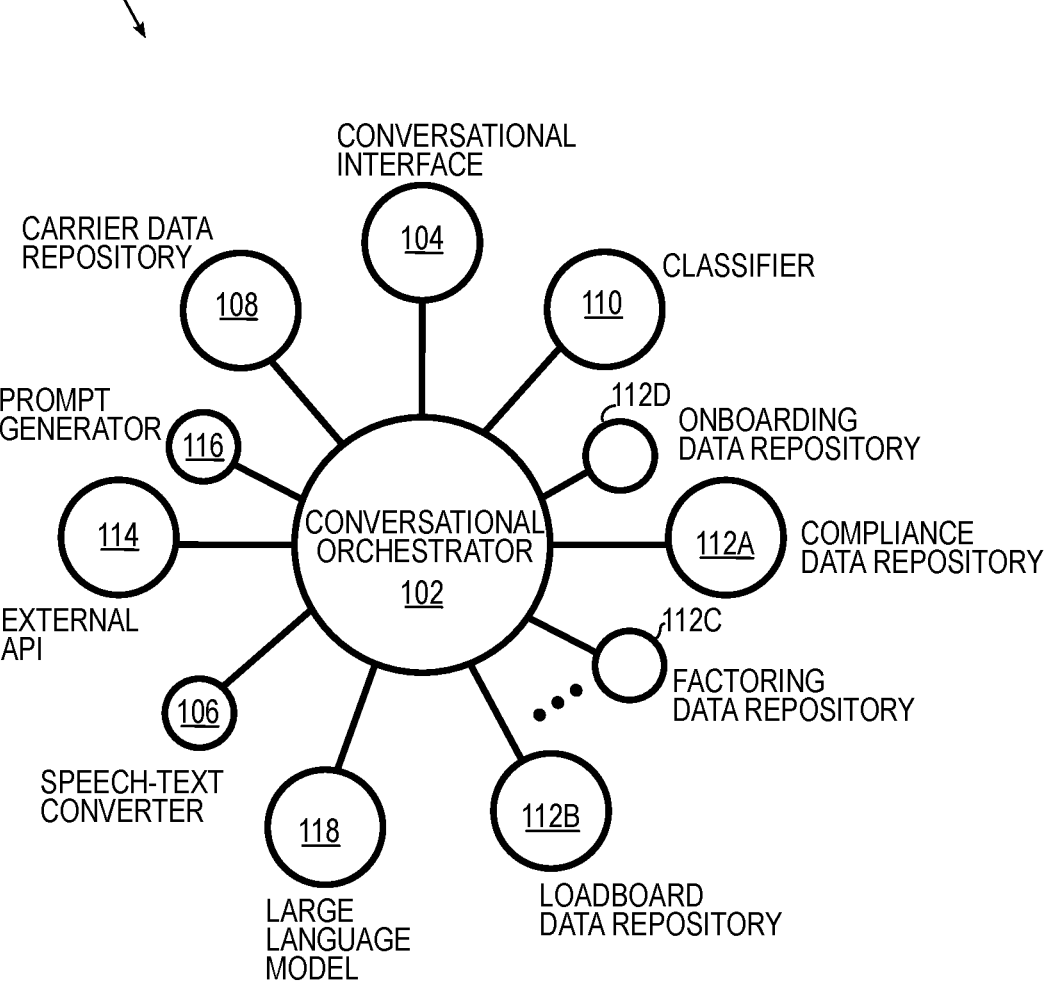
FIG. 1 is a simplified diagram illustrating an example freight management platform with a conversational assistant using AI, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

AI is a growing field in computer science that uses machine learning models to make predictions, recommendations, or classifications based on input data. Revenue from the AI software market worldwide is expected to reach 126 billion dollars by 2025 according to some estimates.

AI uses machine learning models to make predictions, recommendations, and classifications. In general, machine learning models use algorithms to parse data, learn from the parsed data, and make informed decisions based on what it has learned. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms are more relevant to the disclosure herein than any human intervention to provide training data, the former classification is employed herein, such that wherever "machine learning models" is used, it is intended that deep learning models are included as well.

Deep learning models in particular, enable AI algorithms such as generative AI models (e.g., ChatGPT™). In a general sense, AI algorithms have three qualities that differentiate them from other algorithms: intentionality, intelligence, and adaptability. As intentional algorithms, they make decisions, often using real-time data, combining information from a variety of different sources, analyzing the combined information instantly, and acting on insights derived from such data. As intelligent algorithms, they are capable of spotting patterns in underlying data. As adaptable algorithms, they learn and adapt their analyses based on shifting input data.

Recent advances in AI have made possible commercially available AI engines that expose application programming interfaces (APIs) for other applications to consume. In a general sense, the API is a set of rules and protocols that defines how two software systems may communicate with each other. AI APIs allow advanced AI capabilities of the AI engine to be integrated into applications by allowing the application to make requests to the API and receiving responses. Thus, these applications provide, through the API, data to the AI engine, which runs machine learning models on the data to give suitable results as requested by the applications. Different AI engines may use different machine learning models, thereby providing different results to the same input data. Some AI engines may provide a certain functionality (e.g., text processing only) and some other AI engines may provide a certain other functionality (e.g., image processing only), while some others may provide multiple functionalities (e.g., text, speech, and image processing).

One of the applications that uses AI algorithms is a conversational interface, also known as a chatbot application, or conversational agent, or conversational assistant. Typically, chatbot applications converse with users via human-like conversations in a chat (i.e., text) format. At the core of a typical chatbot application is a natural language processing (NLP) module that interprets a user's message and determines an appropriate text response using AI algorithms based on the identified interpretation. Some chatbots are trained to provide information specific to a particular domain, such as banking, finance, computer bug fixing, etc. Most standalone chatbot applications start and stop at this dialogue level, being programmed to reply to only a limited set of questions or statements from the user.

AI chatbots employ a variety of AI technologies, from machine learning that optimize responses over time to NLP and natural language understanding (NLU) that accurately interprets user questions and matches them to specific intents. In the past, chatbot design relied heavily on rule-based approaches, using predefined decision trees to dictate the bot's responses. However, the emergence of large language models (LLMs) such as GPT-4 has revolutionized chatbots, allowing enhanced conversational abilities with domain-specific training. These advanced LLMs leverage AI to comprehend user input and generate human-like text, resulting in a more engaging and effective user experience.

In general, the LLM is a type of neural network that uses a transformer architecture to process and generate sequential data, such as text. The LLMs work based on a combination of NLP and machine learning (ML) techniques. LLMs are trained on vast amounts of text data to understand patterns, relationships, and context in human language. The training allows the model to predict the next word in a sentence or the most appropriate response to a given input based on the context provided by the preceding words. The LLM may also be fine-tuned on specific datasets related to the desired task or domain. This process helps the model specialize in understanding and generating human-like text relevant to the chatbot's purpose. When a user inputs text into the chatbot, the model processes the input, analyzes the context, and predicts the most appropriate response based on its training data and learned patterns. Using the information gathered from the input, the model generates a response that is contextually relevant and meaningful for an accurate and helpful reply to the user's query. Sophisticated deep learning transformer architectures allow LLMs to capture complex linguistic nuances and generate coherent, contextually appropriate responses. These models have the capacity to understand and process natural language in a way that closely resembles human conversation.

While LLMs can, in theory, be used in any suitable application, their usage in a specific implementation varies according to the overall architecture of the software platform. In other words, a marketing company's use of LLMs for content creation may not be quite the same (or remotely similar) as a freight company's use of LLM in a conversational interface, as described by the various embodiments herein. According to various embodiments, a method for implementing a conversational assistant in a freight management platform comprises receiving a user query related to a carrier in natural language from a conversational interface; selecting a data repository according to a classification of the user query into a topic related to freight management, different topics being associated with respective datasets; querying the selected data repository using a carrier identifier identifying the carrier; retrieving from the selected data repository, the respective dataset associated with the carrier identifier; passing a prompt with instructions to a LLM to answer the user query based on a selected persona, a chosen tone, and the retrieved dataset; receiving a response from the LLM to the prompt, the response being based on data in the retrieved dataset; and providing the response to the conversational interface.

In various embodiments, the portion of the freight management platform implementing the conversational orchestrator may have a hub- and spoke software architecture. The conversational orchestrator functions as a central hub facilitating exchange of information and data between various spokes, enabling efficient communication and interaction within the system. One such spoke is the LLM, which may be controlled by a third party in some embodiments and accessed by the conversational orchestrator via a suitable API over a cloud network.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106*a*, 106*b*), such a collection may be referred to herein without the letters (e.g., as "106") and individual ones in the collection may be referred to herein with the letters. Further, labels in upper case in the figures (e.g., 106A) may be written using lower case in the description herein (e.g., 106*a*) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1 is a simplified block diagram illustrating an example freight management platform 100 with a conversational assistant using AI, according to some embodiments of the present disclosure. A conversational orchestrator 102 may interact with a conversational interface 104 that presents the conversational assistant to a human user. A speech-text converter 106 may facilitate converting queries (and/or responses) in text format to speech format and vice-versa, allowing text-to-text, text-to-speech, speech-to-text and speech-to-speech conversions. A carrier data repository 108 may store carrier information, such as name, contact information, DOT number, etc., and associate it with a corresponding carrier identifier. The carrier identifier is a unique code (e.g., combination of letters and numbers, or numbers alone, or letters alone) assigned to a specific transportation company or carrier. The carrier identifier can distinguish and identify individual carriers within the transportation and logistics network. It helps in tracking and managing the movement of freight and goods, enabling shippers, brokers, and other stakeholders to accurately identify and work with specific carriers for their transportation needs. Carrier identifiers are often used in various documentation and communication processes within the freight industry, including freight contracts, bills of lading, freight invoices, and other transportation-related documents.

A classifier 110 may parse incoming queries and classify into one (or more) topics related to freight management, such as compliance, loadboard, onboarding, factoring, etc. Each such topic may be associated with datasets stored in corresponding data repositories 112. Merely for ease of explanation, various data repositories such as compliance data repository 112*a*, loadboard data repository 112*b*, factoring data repository 112*c*, and onboarding data repository 112*d* are shown as distinct and separate from one another. In other embodiments, one or more data repositories may be provisioned in the same physical device. In yet other embodiments, a single data repository may be common among more than one dataset, which may be distinguished from each other by appropriate tags or other markers of the corresponding topics. In addition, although only four separate data repositories 112*a*-112*d* are shown, such is merely for ease of illustration. Any number of data repositories 112 may be included in freight management platform 100 within the broad scope of the embodiments discussed herein. Although not shown for ease of illustration and so as not to clutter the drawing, one or more data repository 112 may be accessed through (or exposed via) a microservice API, for example, configured to receive a data request, identify the appropriate dataset, select the corresponding data repository, retrieve the dataset and provide the dataset to the requesting service (e.g., conversational orchestrator 102).

In some embodiments, conversational orchestrator 102 may communicate with an external application programming interface (API) 114 that provides data not stored internally in freight management platform 100. Examples of external API 114 may include telephone directories, government repositories, etc. A prompt generator 116 may receive a user query and data from conversational orchestrator 102 and generate a suitable prompt for a LLM 118. In various embodiments, LLM 118 may be provisioned outside freight management platform 100, and may interact therewith through a suitable API. LLM 118 may process the prompt provided by prompt generator 116 and output an appropriate response to conversational orchestrator 102, which may forward the response to conversational interface 104.

In various embodiments, freight management platform 100 has a hub-and-spoke design pattern with conversational orchestrator 102 being a central component (i.e., hub), which serves as a common point of communication, data transfer, or coordination for multiple peripheral components (i.e., spokes). The central hub facilitates exchange of information and data between the various spokes, enabling efficient communication and interaction therebetween. The central hub, namely, conversational orchestrator 102, acts as the primary point for managing and coordinating communication between various components 104-118 in freight management platform 100. In some embodiments, conversational orchestrator 102 may simplify integration of peripheral components by providing a common interface and communication protocol for all spokes to interact with. Such an architecture may be scalable and flexible, allowing addition of new spokes or modification of existing ones without affecting the overall system architecture.

Figure 2:
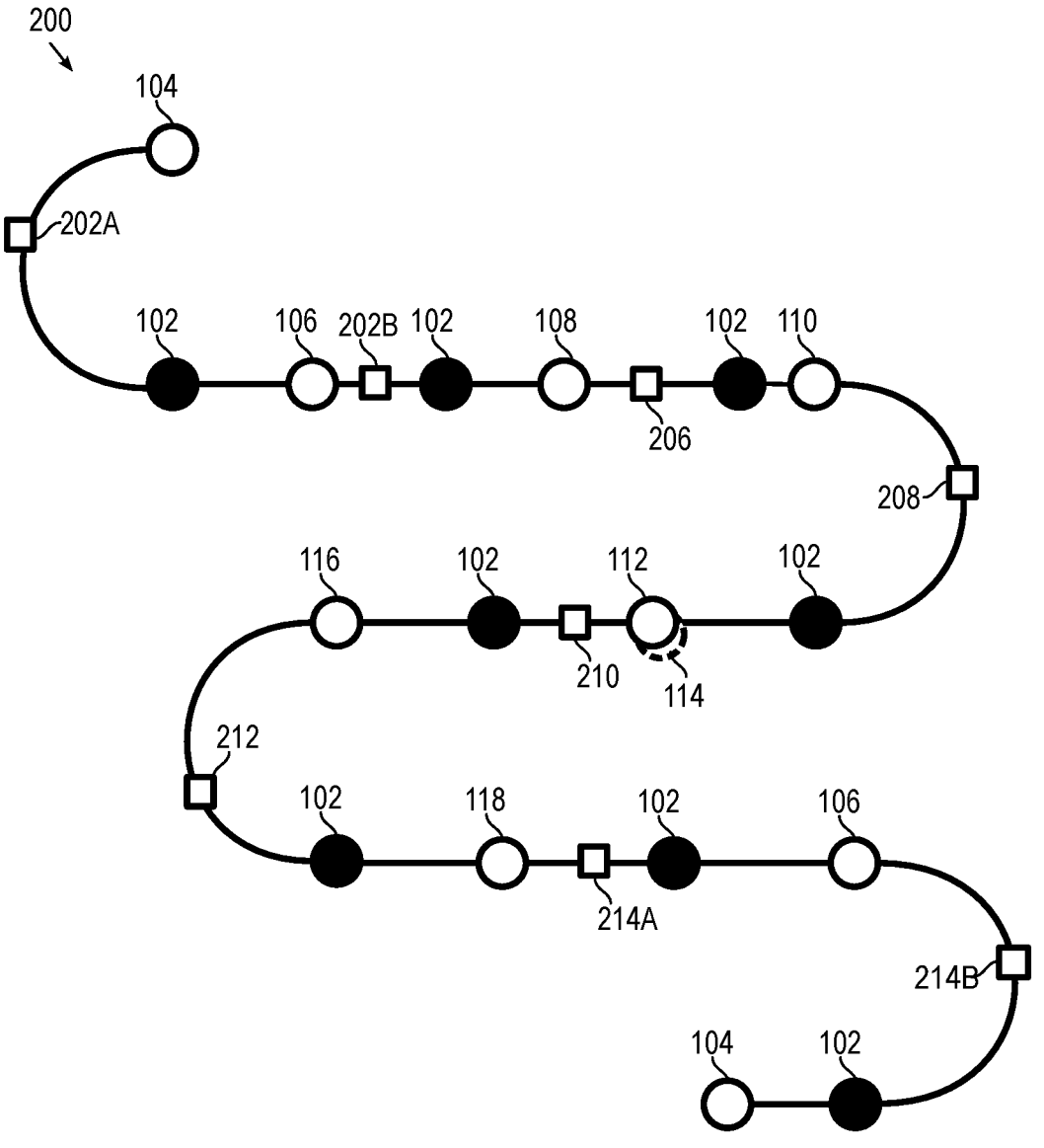
FIG. 2 is a simplified sequence diagram illustrating example details of the freight management platform with a conversational assistant using AI, according to some embodiments of the present disclosure.

FIG. 2 is a simplified sequence diagram illustrating an example sequence 200 in freight management platform 100, according to some embodiments of the present disclosure. Conversational interface 102 may provide a user query 202 to conversational orchestrator 102 in natural language. User query 202 may be provided by a human user interacting with freight management platform 100 through conversational interface 104. In the example embodiment shown, user query 202*a* is in speech format (e.g., human user speaks into a microphone coupled to conversational interface 104). Conversational orchestrator 102 may pass user query 202*a* to speech-text converter 106. Speech-text converter 106 may convert user query 202*a* in speech format to user query 202*b* in text format and send user query 202*b* to conversational orchestrator 102.

Conversational orchestrator 102 may pass user query 202 to carrier data repository 108 and retrieve a carrier identifier 206 identifying the carrier from carrier data repository 108. Conversational orchestrator 102 may subsequently pass user query 202 with carrier identifier 206 to classifier 110 and receive from classifier 110, a classification 208. Classification 208 may classify user query 202 into one (or more) of a plurality of topics, such as compliance, business metrics, onboarding, government filings, loadboard, factoring, frequently asked questions (FAQ), and property management. Each topic may include sub-topics; for example, compliance may include insurance, fraud, carrier profile information including equipment, preferred operating areas, contact information, certifications, etc., intelligence about the carrier, intelligence about the carrier's stated contacts including email and phone validation, validation of the carrier's government forms and filings such as of Internal revenue Service (IRS) W9 submissions, evaluation of government determinations relevant to the carrier, evaluation of known data of the carrier against customer specific business rules, etc. Conversational orchestrator 102 may select an appropriate one of data repository 112 (e.g., 112*a*, 112*b*, etc.) according to classification 208 and query data repository 112 for data associated with carrier identifier 206. Conversational orchestrator 102 may retrieve from selected data repository 112, dataset 210 associated with carrier identifier 206. Dataset 210 may comprise structured data (e.g., in XML format) or unstructured data (e.g., free form). In some embodiments, classification 208 may suggest a topic for external API 114. In such embodiments, conversational orchestrator 102 may query external API 114 and retrieve dataset 210 therefrom. For example, user query 202 may be "what is the carrier's mobile phone number?" which information may be retrieved from an external telephone directory.

Conversational orchestrator 102 may pass retrieved dataset 210 along with user query 202 and carrier identifier 206 to prompt generator 116. Prompt generator 116 may collate data in dataset 210 with suitable instructions to LLM 118 to answer user query 202 based on a selected persona, a chosen tone, and retrieved dataset 210 in a prompt 212. Conversational orchestrator 102 may pass prompt 212 including dataset 210 to LLM 118. LLM 118 may process prompt 212 appropriately and return a response 214 to conversational orchestrator 102. In some embodiments, user query 202 may comprise a plurality of questions (e.g., compound question), in which case prompt 212 includes the plurality of questions, and response 214 includes answers to each one in the plurality of questions.

In some embodiments, as in the example shown, response 214, denoted as 214*a*, may be in text format, whereas conversational interface 104 may expect it in speech format. In such embodiments, conversational orchestrator 102 may pass response 214*a* to speech-text converter 106, which may convert response 214*a* in text format to response 214*b* in speech format. Conversational orchestrator 102 may pass response 214*b* in speech format to conversational interface 104.

Figure 3:
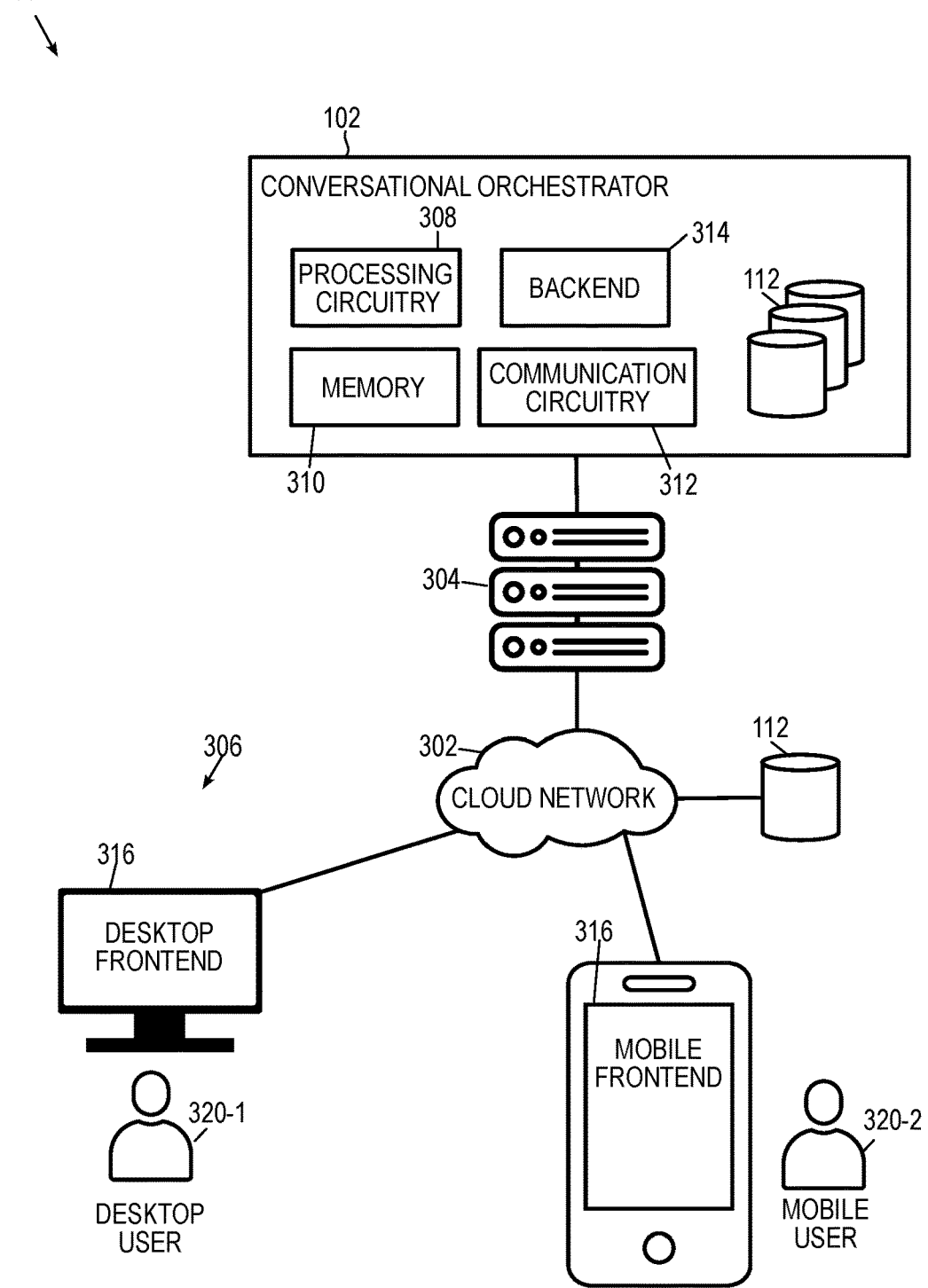
FIG. 3 is a simplified block diagram illustrating other example details of the freight management platform with a conversational assistant using AI, according to some embodiments of the present disclosure.

FIG. 3 is a simplified block diagram illustrating other example details of the freight management platform with a conversational assistant using AI, according to some embodiments of the present disclosure. In example implementations, at least some portions of the activities outlined herein may be hosted on a cloud network 302 in one or more servers 304. At least some other portions of the activities outlined herein may be implemented in one or more computing devices 306 connected over one or more communication networks with cloud network 302. In particular embodiments, cloud network 302 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 306 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of freight management platform 100 may execute using a processing circuitry 308, a memory 310 and communication circuitry 312 (among other components) in one or more servers 304. Certain other portions of freight management platform 100 may execute in one or more computing devices 306 using respective processing circuitry, memory, and communication circuitry (not shown with particularity so as not to clutter the drawing) substantially similar in functionalities to processing circuitry 308, memory 310 and communication circuitry 312. In some embodiments, one or more of these features may be implemented in hardware, provided external to these elements, or consolidated in any appropriate manner to achieve the intended functionality. The various network elements in freight management platform 100 may include communication software that can coordinate to achieve the operations as outlined herein. In still other embodiments, these elements may include any suitable algorithms, hardware, software, components, modules, interfaces, or objects that facilitate the operations thereof.

Processing circuitry 308 may execute any type of instructions associated with data stored in memory 310 to achieve the operations detailed herein. In one example, processing circuitry 308 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 310 may store data used for the operations described herein. This includes memory 310 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 310 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 310 may share a die with processing circuitry 308. Memory 310 may include algorithms, code, software modules, and applications, which may be executed by processing circuitry 308. The data being tracked, sent, received, or stored in freight management platform 100 may be provided in any database, register, table, cache, queue, control list, or storage structure, based on particular needs and implementations, all of which could be referenced in any suitable timeframe.

Communication circuitry 312 may be configured for managing wired or wireless communications for the transfer of data in freight management platform 100. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 312 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 312 may operate in accordance with other wireless protocols in other embodiments. Communication circuitry 312 may include antennas to facilitate wireless communications and/or to receive other wireless communications.

In some embodiments, communication circuitry 312 may manage wired communications, such as electrical, optical, or any other suitable communication protocols (e.g., the Ethernet, Internet). Communication circuitry 312 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

In various embodiments, freight management platform 100 may be partitioned into a backend 314 and a frontend 316. Backend 314 may comprise various components of conversational orchestrator 102, such as logic, rules, routers, etc. Likewise, frontend 216 may comprise web interface or application interface provisioned in one or more computing devices 306. Backend 314 may comprise various modules, logic, software engines and other components that are distributed (and common) across all users of freight management platform 100. Backend 314 may execute operations for managing and processing data, performing computations, and facilitating communication between different components, such as components of conversational orchestrator 102. In particular embodiments, backend 314 may include operations such as data management, business logic, user authentication and authorization, security and validation, application programming interfaces (APIs) with third-party components such as payment processors, etc. In some embodiments (as shown), data repositories 112 may be provisioned as a part of conversational orchestrator 102; in other embodiments, data repositories 112 may be provisioned in separate servers distant from conversational orchestrator 102. In some embodiments, one or more data repositories 112 may be provisioned in a remote location, accessible by server 304 across cloud network 302. Such data repositories 112 may be third-party repositories in some embodiments (e.g., owned and controlled by third-parties and made accessible to freight management platform 100 through suitable APIs); in other embodiments, such data repositories 112 may be part of freight management platform 100.

In a general sense, frontend 316 comprises a user interface using which users interact with freight management platform 100. Frontend 316 may also include libraries, forms, device integrators and other components as desired and based on particular needs. Frontend 316 may be presented on a suitable display device coupled to computing device 306 and appropriate to show visual indicators, such as a heads-up display, a computer monitor, a projector, a touch-screen display, a liquid crystal display (LCD), a light-emitting diode display, and/or a flat panel display. In various embodiments, frontend 316 may be specific to the particular access credentials of the user accessing freight management platform 100. For example, carriers may be presented with one frontend 316; brokers may be presented with another frontend 316; and logistics companies may be provided with yet another frontend 316. In some embodiments, frontend 316 may conform to the device; for example, desktops may have one frontend 316 and mobile devices may have another frontend 316. In various embodiments, frontend 316 may be a web browser in which conversational interface 104 executes. In other embodiments, frontend 316 may comprise a standalone application in which conversational interface 104 executes.

Freight management platform 100 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 4:
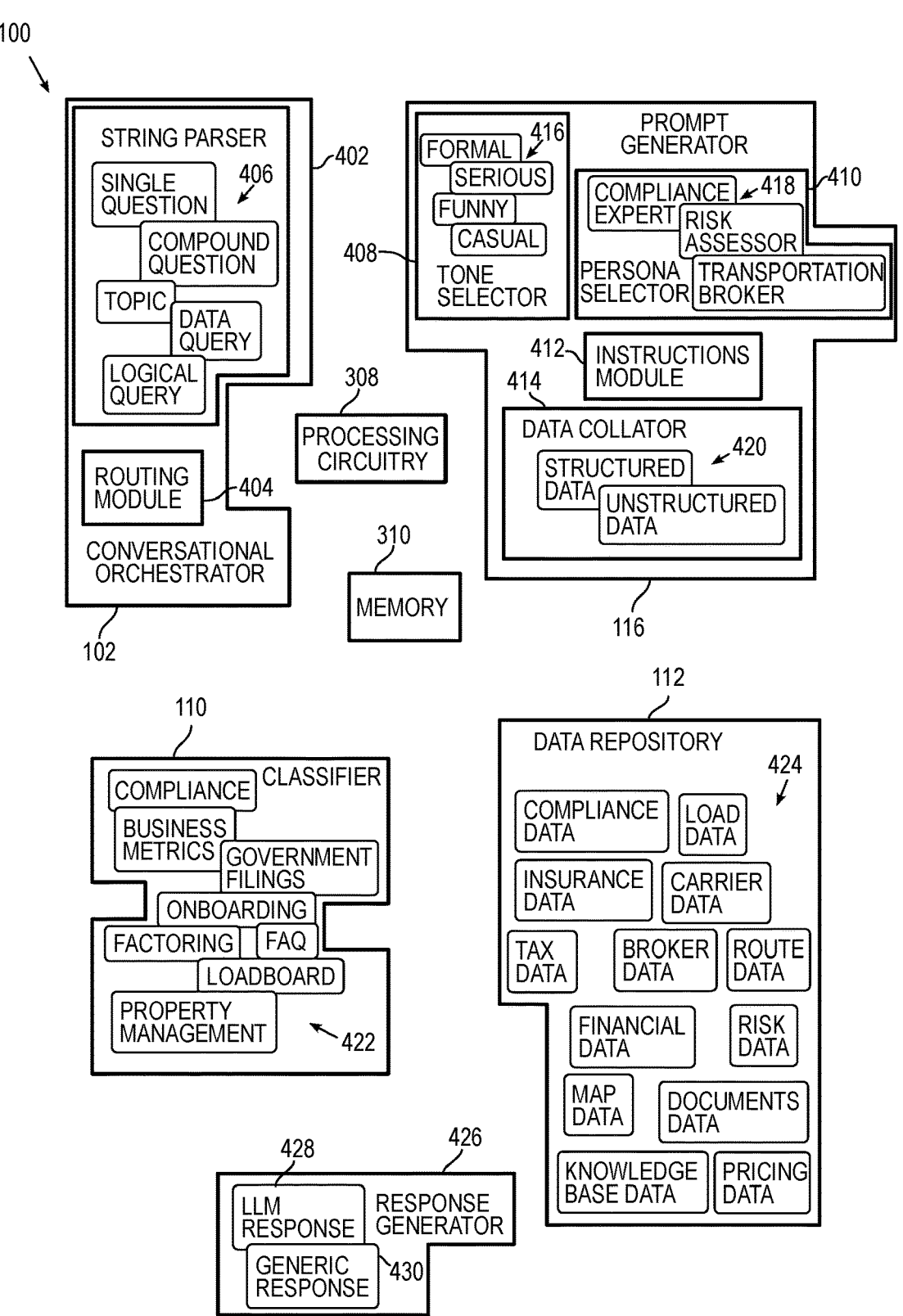
FIG. 4 is a simplified block diagram illustrating other example details of the freight management platform with a conversational assistant using AI, according to some embodiments of the present disclosure.

FIG. 4 is a simplified block diagram illustrating other example details of freight management platform 100, according to some embodiments of the present disclosure. In some embodiments, conversational orchestrator 102 may comprise a string parser 402 and a routing module 404. String parser 402 may identify various elements 406 in user query 202. For example, string parser 402 may determine that user query 202 contains only a single question; or that it contains more than one question. In some scenarios, string parser 402 may decipher one or more topics relevant to user query 202; string parser 402 may determine that user query 202 relates to a simple data query in one instance, whereas in another instance, string parser 402 may determine that user query 202 comprises a logical question that requires further analysis to respond. Elements 406 identified by string parser 402 may inform any subsequent determination by routing module 404 as to the destination of any message from conversational orchestrator 102 to one or more components in freight management platform 100.

For example, string parser 402 may determine that user query 202 contains a logical question about a particular carrier's ability to pay for damages in the event of an accident, and the carrier has been identified only by name in the query. Based on this determination, routing module 404 may contact carrier data repository 108 to obtain carrier identifier 206 based on the carrier's name provided in user query 202. Routing module 404 may thereafter route user query 202, tagged with carrier identifier 206 to classifier 110 for classification. Upon receiving a response, routing module 404 may contact appropriate data repository 112 according to the classification. The process may continue until response 214 has been provided to conversational interface 104.

In another example, string parser 402 may determine that user query 202 is asking for a carrier's phone number, and the carrier has been identified only by name in the query. Based on this determination, routing module 404 may directly contact external API 114 with the carrier's phone number to obtain intelligence about that phone number. In various embodiments, routing module 404 may be provisioned with a set of rules and sequences for determining a next routing action based on the received input.

In various embodiments, prompt generator 116 may include a tone selector 408, a persona selector 410, an instructions module 412 and a data collator 414. Tone selector 408 may select from various tones 416, such as formal, serious, funny, casual, etc. Selected tone 416 may be provided to LLM 118 to craft a suitable response accordingly. Persona selector 410 may select from various personas 418, such as compliance expert, risk assessor, transportation broker, carrier, etc. Persona 418 may be selected based on classification 208 in some embodiments. For example, if classification 208 suggests that user query 202 is related to compliance, selected persona 418 may be of a compliance expert. Instructions module 412 may include various pre-programmed textual instructions, such as "You are [insert selected persona]. What can you tell me about [insert user query] based on this attached data. Give me a response in [insert selected tone]." The textual instructions may be generated based on predetermined rules, decision trees, heuristically, or by any suitable method according to particular needs. Data collator 414 may collate data (e.g., collect data and combine with textual instructions in proper manner) from one or more data repositories 112. The data collated may be in various formats 420, for example structured format (i.e., structured data, for example, in XML format, with field and corresponding values, etc.) or unstructured format (i.e., unstructured data, in free form, text, etc.).

In various embodiments, classifier 110 may include instructions to classify user query 202 into one or more topics 422, such as compliance, business metrics, government filings, onboarding, factoring, FAQ, loadboard, and property management (among other topics). One or more topics 422 may include sub-topics; for example, compliance may include insurance, fraud, carrier profile information including equipment, preferred operating areas, contact information, certifications, etc., intelligence about the carrier, intelligence about the carrier's stated contacts including email and phone validation, validation of the carrier's government forms and filings such as of IRS W9 submissions, evaluation of government determinations relevant to the carrier, evaluation of known data of the carrier against customer specific business rules, etc. Each topic 422 may be associated with at least one separate dataset 424 stored in one or more data repository 112. Examples of dataset 424 include compliance data, load data, insurance data, carrier data, tax data, broker data, route data, financial data, risk data, map data, documents data, knowledge base data (e.g., information derived from heuristics, third-party sources such as news sites, white papers, published articles, and other such sources relevant to freight management), pricing data (e.g., pricing intelligence or rate intelligence), etc. Some topics may be associated with more than one dataset 424. For example, the loadboard topic may be associated with carrier data, load data, route data, broker data, pricing data, and map data (among others).

In various embodiments, a response generator 426 may be provisioned in freight management platform 100. Response generator 426 may include a LLM response 428 for generating a response provided by LLM 118 and a generic response 430 for generating a response not provided by LLM 118. LLM response 428 may directly receive response 214 from LLM 118 and forward to conversational orchestrator 102. Generic response 430 may have instructions to generate a textual response based on data provided by conversational orchestrator 102 or based on other factors, such as a default response when no data is found for a suitable response. The instructions may be based on a predetermined decision tree, heuristic rules, or other considerations according to particular needs.

In various embodiments, the components described herein may be provisioned in one or more servers 304 in cloud network 302, stored in memory 310 and executed by processing circuitry 308 as described in reference to the previous figures.

Figure 5:
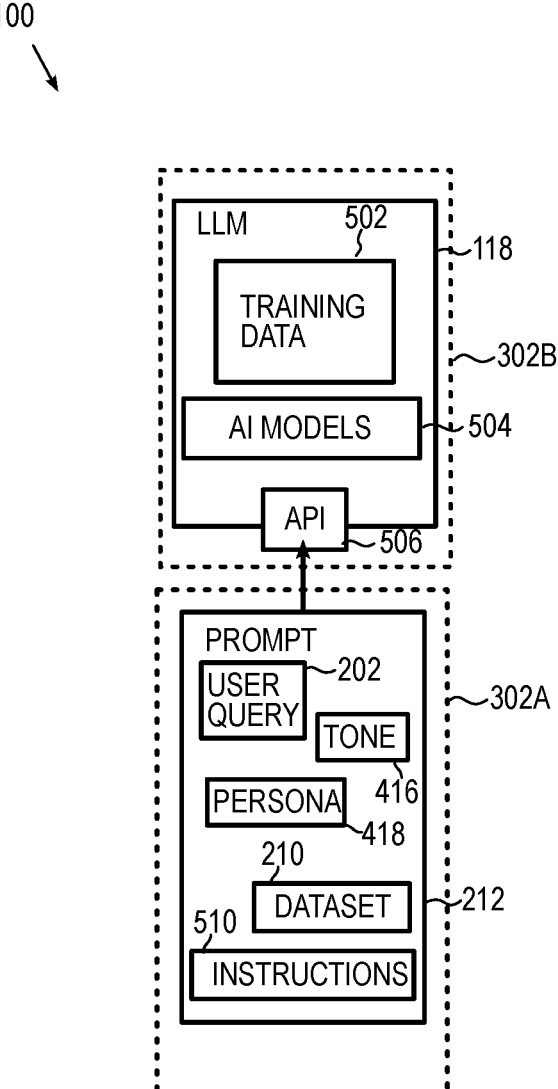
FIG. 5 is a simplified block diagram illustrating other example details of the freight management platform with a conversational assistant using AI, according to some embodiments of the present disclosure.

FIG. 5 is a simplified block diagram illustrating other example details of freight management platform 100, according to some embodiments of the present disclosure. LLM 118 may include training data 502, AI models 504, and API 506. Training data 502 may include a vast corpus of textual data from various sources. AI models 504 may include various neural network algorithms, NLP algorithms and other mathematical algorithms, for example, as used by GPT-4.

Prompt 212 may be provided to LLM 118 via API 506. Prompt 212 may include user query 202, suggested tone 416, selected persona 418, and dataset 210 that provides contextual data for a suitable response by LLM 118. Instructions 510 may comprise textual instructions to LLM 118 to answer user query 202 in tone 416 by assuming persona 418 and using dataset 210.

In various embodiments, prompt 212 may be generated in a first cloud network 302a and provided to LLM 118 executing in a second cloud network 302b. Cloud networks 302a and 302b may be physically proximate in some embodiments; in other embodiments, cloud networks 302a and 302b may be physically distant. In some embodiments, cloud networks 302a and 302b may be controlled by the same entity (e.g., same corporation); in other embodiments, cloud networks 302a and 302b may be controlled by different entities.

In various embodiments, training data 502 may have no connection to, or be associated in any manner with, dataset 210. Training data 502 may be independently provided to (or be otherwise provisioned in) LLM 118 apart from dataset

210. Nevertheless, dataset 210 may provide contextual information from which LLM 118 may derive response 214. In other words, response 214 generated by LLM 118 may be formatted to approximate human language based on training data 502 and include information derived from dataset 210. In various embodiments, AI models 504 may temporarily cache dataset 210 and parse dataset 210 based on instructions 510 to derive the appropriate information to include in response 214. In some such embodiments, the temporary cache of dataset 210 may be deleted from LLM 118 after response 214 is generated (e.g., immediately in some embodiments, or after a preconfigured period, such as fourteen days or thirty days, etc.). In some other such embodiments, dataset 210 may be incorporated into training data 502 after response 214 is generated.

In one example, user query 202 may be, "If this carrier were to get in an accident and my freight was damaged, how much money could I recoup?" Based on this question, conversational orchestrator 102 may analyze, query and otherwise communicate with various components as described in the foregoing figures so that prompt 212 may include the following features: tone 416 is "serious," persona 418 is "compliance expert," dataset 210 includes compliance data, and instructions 510 are to derive response 214 to user query 202 based on the attached data. In response, LLM 118 may provide response 214 as follows: "You could potentially recoup up to $250,000, as the carrier's cargo insurance has a cargo limit of this amount. However, the exact amount may depend on the specific circumstances of the accident and the details of the insurance policy." The language of response 214 may be based on training data 502; the amounts and the type of insurance specified may be based on dataset 210. The caveat may be provided according to persona 418.

Figure 6A:
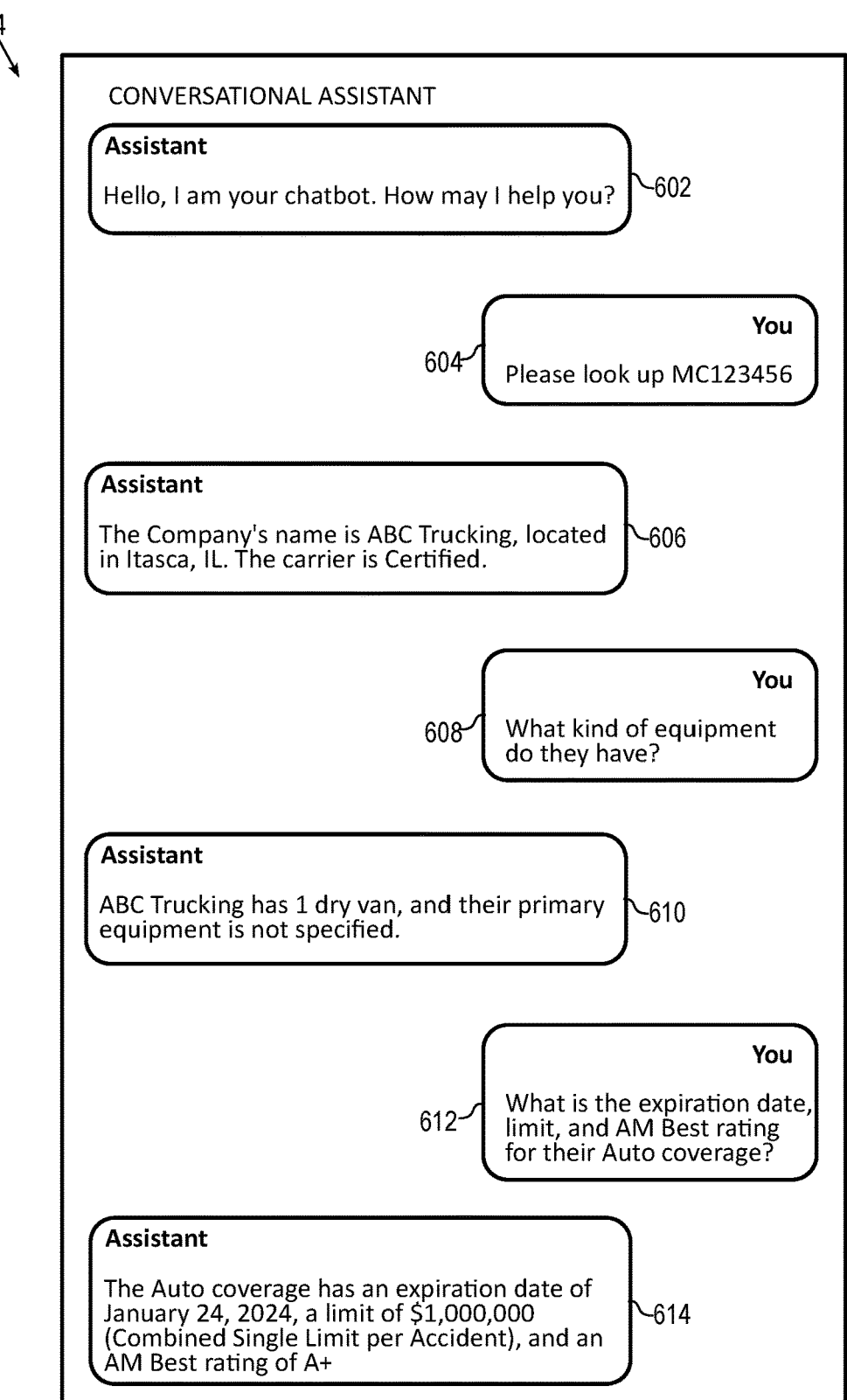

FIGS. 6A and 6B are simplified diagrams showing an example conversation between a human "You" and the conversational assistant of the embodiments described herein over conversational interface 104. The assistant may present a default statement 610, such as "Hello, I am your chatbot. How may I help you?" when a human user instantiates conversational interface 104. The human user may respond with user query 202 comprising statement 604, "Please look up MC123456." Behind the scenes, conversational orchestrator 102 may parse statement 604 and identify MC123456 as a possible identifier of a particular carrier. Conversational orchestrator 102 may query carrier data repository 108 and confirm MC123456 as the particular carrier. In some embodiments, other details about the carrier may be obtained from carrier data repository 108 and provided to response generator 426, which may generate statement 606, "The Company's name is ABC Trucking, located in Itasca, IL. The carrier is Certified." In some other embodiments, conversational orchestrator 102 may provide the dataset in carrier data repository 108 to prompt generator 116, which may communicate with LLM 118, providing the retrieved dataset. LLM 118 may generate statement 606, which conversational orchestrator 102 may provide to conversational interface 104.

The human user may follow up with another question 608, "what kind of equipment do they have?" as user query 202. Conversational orchestrator 102 may route user query 202 to classifier 110, which may determine classification 208 as related to compliance; conversational orchestrator 102 may query data repository 112a that houses compliance datasets and retrieve dataset 210 associated with carrier identifier MC123456. Conversational orchestrator 102 may then route dataset 210 to prompt generator 116, which may generate suitable prompt 212. Conversational orchestrator 102 may transmit prompt 212 to LLM 118 over API 506 and receive response 214 thereto, which may comprise statement 610, "ABC Trucking has 1 dry van, and their primary equipment is not specified."

The human user may follow up with another question 612, "What is the expiration date, limit, and AM Best rating for their Auto coverage?" as user query 202. Conversational orchestrator 102 may determine this as a compound question containing more than one question. Conversational orchestrator 102 may route user query 202 to classifier 110, which may determine classification 208 as related to compliance. In some embodiments, conversational orchestrator 102 may query data repository 112*a* that houses compliance datasets and retrieve dataset 210 associated with carrier identifier MC123456. In other embodiments, the previously retrieved dataset 210 may be stored temporarily by conversational orchestrator 102, and such stored data may be re-used. Conversational orchestrator 102 may route dataset 210 to prompt generator 116, which may generate suitable prompt 212. Conversational orchestrator 102 may transmit prompt 212 to LLM 118 over API 506 and receive response 214 thereto, which may comprise statement 614 comprising answers to all the questions in the compound question, "The Auto coverage has an expiration date of Jan. 24, 2024, a limit of $1,000,000 (Combined Single Limit per Accident), and an AM Best rating of A+."

The conversation may continue with question 616, answer 618, and so on until the conversation is ended by the human user. Some questions, such as question 608 may be a simple data query that may not require LLM 118 for answering; others, such as questions 612 and 616 may be more complex, requiring LLM 118 for answering, as well as more than one dataset 210 for context; yet other questions, such as question 624 may be a logical question requiring semantical understanding and analysis by LLM 118. Any suitable question may be provided in user query 202, and suitable response 214 may be provided back according to various embodiments. In scenarios where a suitable response cannot be provided, for example, due to lack of data, a default or generic response may be provided.

Figure 7:
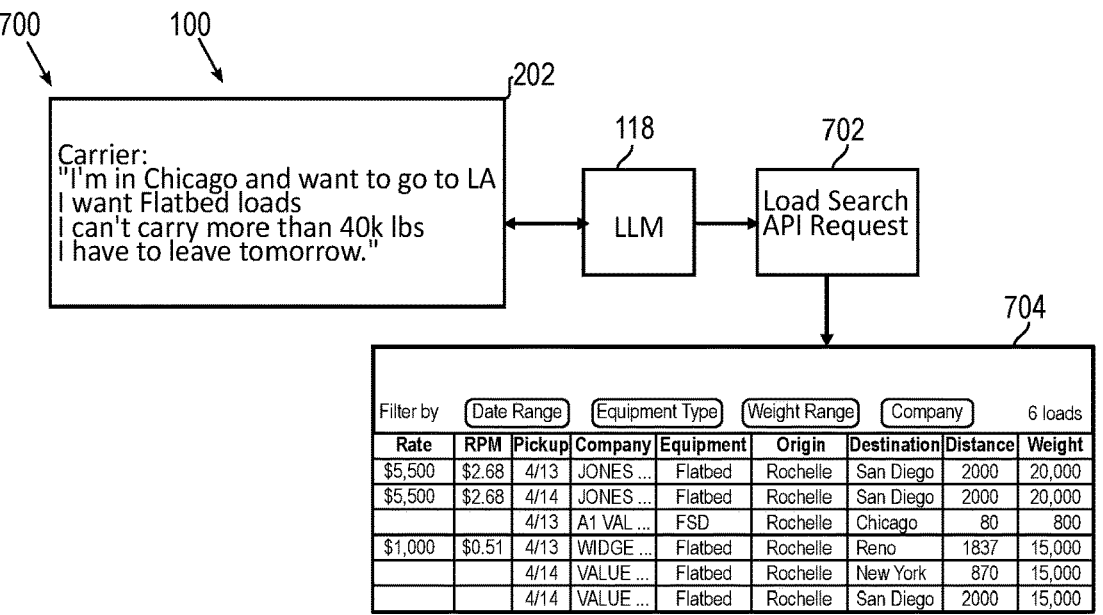
FIG. 7 is a simplified block diagram illustrating other example details of the freight management platform with a conversational assistant using AI, according to some embodiments of the present disclosure.

FIG. 7 is a simplified diagram illustrating example details related to loadboard querying 700 of freight management platform 100 according to various embodiments. An example user query 202 may be, "I'm in Chicago and want to go to LA. I want Flatbed loads. I can't carry more than 40 k lbs. I have to leave tomorrow." User query 202 may be used to generate prompt 212 that is fed to LLM 118. LLM 118 may respond with response 214 comprising a load search API request 702, for example, including search parameters alone in some embodiments, and a formatted load search API request having the search parameters in other embodiments. Load search API request 702 with the search parameters may be fed to loadboard 704, which may return the result of the search suitably. Conversational orchestrator 102 may thereafter send the search results to a loadboard user interface, which may display the results. Thus, in response to user query 202, loadboard user interface may be displayed (e.g., in the same window as the conversational assistant in some embodiments; in another window different from the conversational assistant in other embodiments) with the results of the search.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, freight management platform 100 may be implemented in other networks such as LANs. Moreover, although freight management platform 100 has been illustrated with reference to particular elements and operations that facilitate the software process, these elements, and operations may be replaced by any suitable architecture or process that achieves the intended functionality of freight management platform 100.

Example Methods

Figure 8:
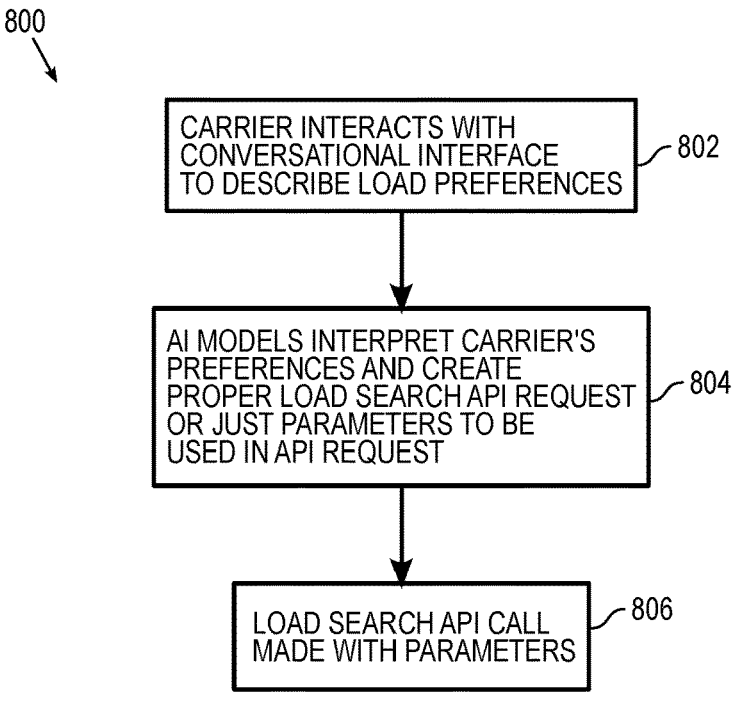
FIG. 8 is a simplified flow diagram illustrating example operations associated with the freight management platform with a conversational assistant using AI, according to some embodiments of the present disclosure.

FIG. 8 is a simplified flow diagram illustrating example operations 800 associated with the freight management platform 100, according to some embodiments of the present disclosure. At 802, a carrier (i.e., human user representing a carrier) may interact with conversational interface 104 to describe load preferences. The interaction may result in generation of user query 202. At 804, AI models 504 in LLM 118 may interpret the carrier's preferences and create a proper load search API request or just parameters to be used in the API request. At 806, load search API call may be made with the parameters returned by LLM 118 to loadboard 704.

FIG. 9 is a simplified flow diagram illustrating other example operations 900 associated with freight management platform 100, according to some embodiments of the present disclosure. At 902, conversational orchestrator 102 may receive from conversational interface 102, user query 202 in natural language. User query 202 may be provided by a human user interacting with freight management platform 100 through conversational interface 104. In some embodiments, user query 202 may be in speech format (e.g., human user speaks into a microphone coupled to conversational interface 104), which may be converted to text format by speech-text converter 106. At 904, conversational orchestrator 102 may pass user query 202 to carrier data repository 108. At 906, conversational orchestrator 102 may receive carrier identifier 206 identifying the carrier from carrier data repository 108. At 908, conversational orchestrator 102 may pass user query 202 with carrier identifier 206 to classifier 110. At 910, conversational orchestrator 102 may receive classification 208 from classifier 110. Classification 208 may classify user query 202 into one (or more) of a plurality of topics, such as compliance, business metrics, onboarding, government filings, loadboard, factoring, FAQ, and property management. Each topic may have associated sub-topics. For example, compliance may include insurance, fraud, carrier profile information including equipment, preferred operating areas, contact information, certifications, etc., intelligence about the carrier, intelligence about the carrier's stated contacts including email and phone validation, validation of the carrier's government forms and filings such as of IRS W9 submissions, evaluation of government determinations relevant to the carrier, evaluation of known data of the carrier against customer specific business rules, etc.

At 912, conversational orchestrator 102 may select an appropriate one of data repository 112 (e.g., 112*a*, 112*b*, etc.) according to classification 208. At 914, conversational orchestrator 102 may query selected data repository 112 for data associated with carrier identifier 206. At 916, conversational orchestrator 102 may retrieve from selected data repository 112, dataset 210 associated with carrier identifier 206. Dataset 210 may comprise structured data (e.g., in XML format) or unstructured data (e.g., free form). In some embodiments, classification 208 may suggest a topic for external API 114. In such embodiments, conversational orchestrator 102 may query external API 114 and retrieve dataset 210 therefrom.

At 910, conversational orchestrator 102 may pass retrieved dataset 210 along with user query 202 and carrier identifier 206 to prompt generator 116. Prompt generator 116 may collate data in dataset 210 with suitable instructions to LLM 118 to answer user query 202 based on a selected persona, a chosen tone, and retrieved dataset 210 in a prompt 212, which may be received by conversational orchestrator 102 at 920. At 922, conversational orchestrator 102 may pass prompt 212 including dataset 210 to LLM 118. LLM 118 may process prompt 212 appropriately and return a response 214 to conversational orchestrator 102 at 924. In some embodiments, response 214 may be in text format, whereas conversational interface 104 may expect it in speech format. In such embodiments, speech-text converter 106 may convert response 214 in text format to speech format. At 926, response 214 may be displayed (or otherwise provided) on conversational interface 104.

Figure 10:
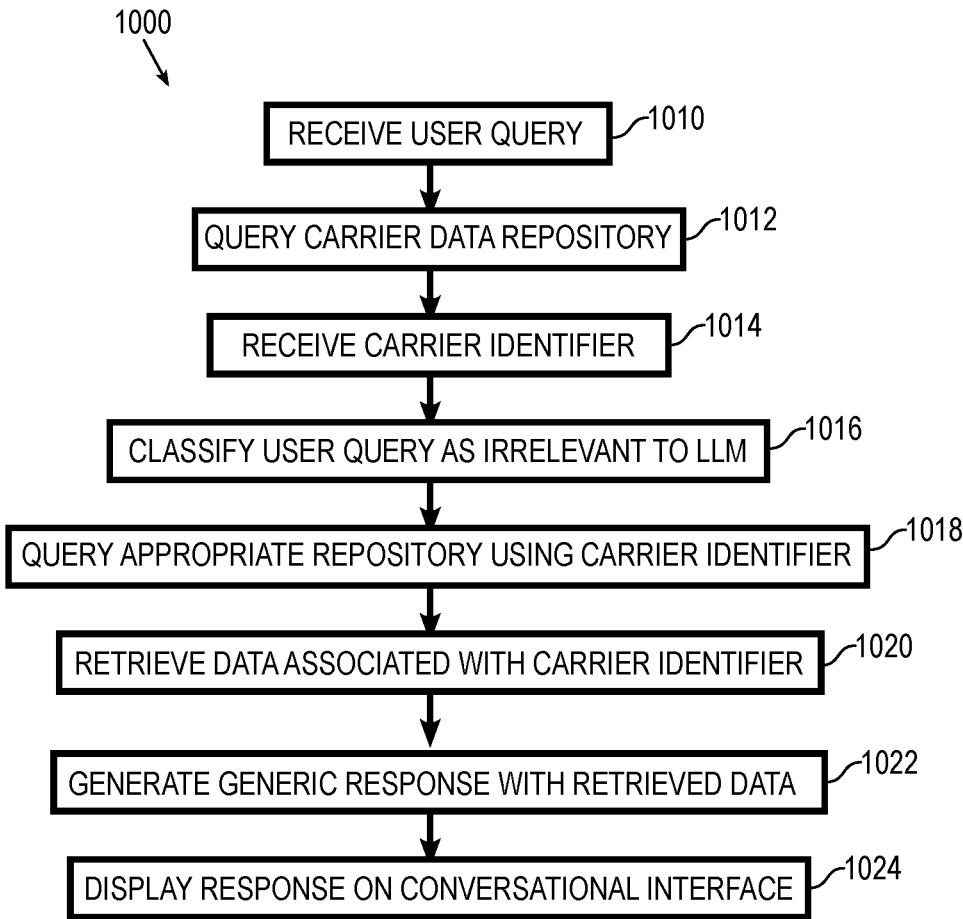
FIG. 10 is a simplified flow diagram illustrating yet other example operations associated with the freight management platform with a conversational assistant using AI, according to some embodiments of the present disclosure.

FIG. 10 is a simplified flow diagram illustrating yet other example operations 1000 associated with freight management platform 100, according to some embodiments of the present disclosure. At 1010, user query 202 may be received at conversational orchestrator 102. At 1012, conversational orchestrator 102 may query carrier data repository 108. At 1014, conversational orchestrator 102 may receive carrier identifier 206 from carrier data repository 108. At 1016, classifier 110 may classify user query 202 as irrelevant to LLM 118, at 1018, conversational orchestrator 102 may query appropriate data repository 112 using carrier identifier 206. At 1020, relevant data associated with carrier identifier 206 may be retrieved from data repository 112. At 1022, response generator 426 may generate generic response 430 with the retrieved data. At 1024, generic response 430 may be displayed on conversational interface 104.

In various embodiments, the operations described in FIGS. 8-10 are performed automatically without human intervention. Although FIGS. 8-10 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 8-10 may be modified in accordance with the present disclosure to facilitate conversational orchestrator 102 in freight management platform 100 as disclosed herein. Although various operations are illustrated in FIGS. 8-10 once each, the operations may be repeated as often as desired.

It is important to note that the operations described with reference to the preceding figures illustrate only some of the possible scenarios that may be executed by, or within, freight management platform 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method for implementing a conversational assistant in a freight management platform, the method including: receiving, at a conversational orchestrator in the freight management platform, a user query (e.g., 202) in natural language from a conversational interface (e.g., 104), the user query being related to a carrier; selecting, by the conversational orchestrator, a data repository (e.g., 112a, 112b, etc.) according to a classification (e.g., 208) of the user query into one of a plurality of topics related to freight management, each topic being associated with a separate dataset; querying, by the conversational orchestrator, the selected data repository using a carrier identifier (e.g., 206) identifying the carrier; retrieving, by the conversational orchestrator from the selected data repository, the respective dataset (e.g., 210) associated with the carrier identifier and the classification; receiving, at the conversational orchestrator, a prompt (e.g., 212) with instructions to a large language model (LLM) (e.g., 118) to answer the user query based on a selected persona, a chosen tone, and the retrieved dataset; passing, by the conversational orchestrator, the prompt including the retrieved dataset to the LLM; receiving, at the conversational orchestrator, a response (e.g., 214) from the LLM to the prompt, the response being based on data in the retrieved dataset; and providing, by the conversational orchestrator, the response to the conversational interface.

Example 2 provides the method of example 1, further including passing, by the conversational orchestrator, the user query to a carrier data repository (e.g., 108); and retrieving, at the conversational orchestrator, the carrier identifier identifying the carrier from the carrier data repository.

Example 3 provides the method of example 1 or 2, further including passing, by the conversational orchestrator, the user query to a classifier (e.g., 110) executing in the freight management platform; and receiving, from the classifier, the classification.

Example 4 provides the method of any one of examples 1-3, further including receiving, at the conversational orchestrator, the user query in speech format (e.g., 202b); passing, by the conversational orchestrator, the user query to a speech-text converter (e.g., 106); and receiving, at the conversational orchestrator, the user query in text format from the speech-text converter.

Example 5 provides the method of any one of examples 1-4, in which: the response is in text format, and the method further includes passing, by the conversational orchestrator, the response to a speech-text converter; and receiving, at the conversational orchestrator, the response in speech format (e.g., 216) from the speech-text converter before providing the response to the conversational interface.

Example 6 provides the method of any one of examples 1-5, in which the topics include compliance, business metrics, onboarding, government filings, loadboard, factoring, frequently asked questions, and property management.

Example 7 provides the method of example 6, in which the compliance includes insurance, fraud, contracts, carrier profile information, and intelligence about the carrier including validation of the carrier's government forms and filings, and evaluation of government determinations relevant to the carrier.

Example 8 provides the method of any one of examples 1-7, in which the retrieved dataset includes at least one of structured data and unstructured data.

Example 9 provides the method of any one of examples 1-8, further including collating, by a prompt generator (e.g., 116) in the freight management platform, the retrieved dataset with instructions to the LLM to respond to the user query; generating, by the prompt generator, the prompt; and sending, by the prompt generator, the prompt to the conversational orchestrator.

Example 10 provides the method of any one of examples 1-9, in which: the user query includes a plurality of questions, the prompt includes the plurality of questions, and the response includes answers to each one in the plurality of questions.

Example 11 provides the method of any one of examples 1-10, in which: the freight management platform includes data related to users of the freight management platform, and the data includes compliance data, load data, insurance data, carrier data, tax data, broker data, pricing data, route data, financial data, risk data, map data, documents data, and knowledge base data.

Example 12 provides the method of any one of examples 1-11, in which: the user query is related to a loadboard; and the response returns one or more parameters for use in a load search application programming interface (API) request to the loadboard.

Example 13 provides the method of any one of examples 1-12, in which the conversational interface executes in a web browser of at least one of a desktop computer and a mobile device.

Example 14 provides the method of any one of examples 1-12, in which the conversational interface executes in a standalone application of at least one of a desktop computer and a mobile device.

Example 15 provides the method of any one of examples 1-14, further including determining, by the conversational orchestrator, that the classification is related to an external API (e.g., 114); and querying the external API for information relevant to the user query.

Example 16 provides non-transitory computer-readable tangible media that includes instructions for execution, which when executed by a processor of a computing device, is operable to perform operations including receiving, at a conversational orchestrator in a freight management platform, a user query in natural language from a conversational interface, the user query being related to a carrier; selecting, by the conversational orchestrator, a data repository according to a classification of the user query into one of a plurality of topics related to freight management, each topic being associated with a separate dataset; querying, by the conversational orchestrator, the selected data repository using a carrier identifier identifying the carrier; retrieving, by the conversational orchestrator from the selected data repository, the respective dataset associated with the carrier identifier and the classification; receiving, at the conversational orchestrator, a prompt with instructions to a LLM to answer the user query based on a selected persona, a chosen tone, and the retrieved dataset; passing, by the conversational orchestrator, the prompt including the retrieved dataset to the LLM; receiving, at the conversational orchestrator, a response from the LLM to the prompt, the response being based on data in the retrieved dataset; and providing, by the conversational orchestrator, the response to the conversational interface.

Example 17 provides the non-transitory computer-readable tangible media of example 16, the operations further including passing, by the conversational orchestrator, the user query to a carrier data repository; and retrieving, at the conversational orchestrator, the carrier identifier identifying the carrier from the carrier data repository.

Example 18 provides the non-transitory computer-readable tangible media of example 16 or 17, the operations further including passing, by the conversational orchestrator, the user query to a classifier executing in the freight management platform; and receiving, from the classifier, the classification.

Example 19 provides the non-transitory computer-readable tangible media of any one of examples 16-18, the operations further including receiving, at the conversational orchestrator, the user query in speech format; passing, by the conversational orchestrator, the user query to a speech-text converter; and receiving, at the conversational orchestrator, the user query in text format from the speech-text converter.

Example 20 provides the non-transitory computer-readable tangible media of any one of examples 16-19, in which: the response is in text format, and the operations further include passing, by the conversational orchestrator, the response to a speech-text converter; and receiving, at the conversational orchestrator, the response in speech format from the speech-text converter before providing the response to the conversational interface.

Example 21 provides the non-transitory computer-readable tangible media of any one of examples 16-20, in which the topics include compliance, business metrics, onboarding, government filings, loadboard, factoring, frequently asked questions, and property management.

Example 22 provides the non-transitory computer-readable tangible media of example 21, in which the compliance includes insurance, fraud, contracts, carrier profile information, and intelligence about the carrier including validation of the carrier's government forms and filings, and evaluation of government determinations relevant to the carrier.

Example 23 provides the non-transitory computer-readable tangible media of any one of examples 16-22, in which the retrieved dataset includes at least one of structured data and unstructured data.

Example 24 provides the non-transitory computer-readable tangible media of any one of examples 16-23, the operations further including collating, by a prompt generator in the freight management platform, the retrieved data set with instructions to the LLM to respond to the user query; generating, by the prompt generator, the prompt; and sending, by the prompt generator, the prompt to the conversational orchestrator.

Example 25 provides the non-transitory computer-readable tangible media of any one of examples 16-24, in which: the user query includes a plurality of questions, the prompt includes the plurality of questions, and the response includes answers to each one in the plurality of questions.

Example 26 provides the non-transitory computer-readable tangible media of any one of examples 16-25, in which: the freight management platform includes data related to users of the freight management platform, and the data includes compliance data, load data, insurance data, carrier data, tax data, broker data, pricing data, route data, financial data, risk data, map data, documents data, and knowledge base data.

Example 27 provides the non-transitory computer-readable tangible media of any one of examples 16-26, in which: the user query is related to a loadboard; and the response returns one or more parameters for use in a load search API request to the loadboard.

Example 28 provides the non-transitory computer-readable tangible media of any one of examples 16-27, in which the conversational interface executes in a web browser of at least one of a desktop computer and a mobile device.

Example 29 provides the non-transitory computer-readable tangible media of any one of examples 16-27, in which the conversational interface executes in a standalone application of at least one of a desktop computer and a mobile device.

Example 30 provides the non-transitory computer-readable tangible media of any one of examples 16-29, the operations further including determining, by the conversational orchestrator, that the classification is related to an external API; and querying the external API for information relevant to the user query.

Example 31 provides an apparatus including a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: receiving, at a conversational orchestrator in a freight management platform, a user query in natural language from a conversational interface, the user query being related to a carrier; selecting, by the conversational orchestrator, a data repository according to a classification of the user query into one of a plurality of topics related to freight management, each topic being associated with a separate dataset; querying, by the conversational orchestrator, the selected data repository using a carrier identifier identifying the carrier; retrieving, by the conversational orchestrator from the selected data repository, the respective dataset associated with the carrier identifier and the classification; receiving, at the conversational orchestrator, a prompt with instructions to a LLM to answer the user query based on a selected persona, a chosen tone, and the retrieved dataset; passing, by the conversational orchestrator, the prompt including the retrieved dataset to the LLM; receiving, at the conversational orchestrator, a response from the LLM to the prompt, the response being based on data in the retrieved dataset; and providing, by the conversational orchestrator, the response to the conversational interface.

Example 32 provides the apparatus of example 31, further configured for: passing, by the conversational orchestrator, the user query to a carrier data repository; and retrieving, at the conversational orchestrator, the carrier identifier identifying the carrier from the carrier data repository.

Example 33 provides the apparatus of example 31 or 32, further configured for: passing, by the conversational orchestrator, the user query to a classifier executing in the freight management platform; and receiving, from the classifier, the classification.

Example 34 provides the apparatus of any one of examples 31-33, further configured for: receiving, at the conversational orchestrator, the user query in speech format; passing, by the conversational orchestrator, the user query to a speech-text converter; and receiving, at the conversational orchestrator, the user query in text format from the speech-text converter.

Example 35 provides the apparatus of any one of examples 31-34, in which: the response is in text format, and the apparatus is further configured for: passing, by the conversational orchestrator, the response to a speech-text converter; and receiving, at the conversational orchestrator, the response in speech format from the speech-text converter before providing the response to the conversational interface.

Example 36 provides the apparatus of any one of examples 31-35, in which the topics include compliance, business metrics, onboarding, government filings, loadboard, factoring, frequently asked questions, and property management.

Example 37 provides the apparatus of example 36, in which the compliance includes insurance, fraud, contracts, carrier profile information, and intelligence about the carrier including validation of the carrier's government forms and filings, and evaluation of government determinations relevant to the carrier.

Example 38 provides the apparatus of any one of examples 31-37, in which the retrieved dataset includes at least one of structured data and unstructured data.

Example 39 provides the apparatus of any one of examples 31-38, further configured for: collating, by a prompt generator in the freight management platform, the retrieved data set with instructions to the LLM to respond to the user query; generating, by the prompt generator, the prompt; and sending, by the prompt generator, the prompt to the conversational orchestrator.

Example 40 provides the apparatus of any one of examples 31-39, in which: the user query includes a plurality of questions, the prompt includes the plurality of questions, and the response includes answers to each one in the plurality of questions.

Example 41 provides the apparatus of any one of examples 31-40, wherein: the freight management platform includes data related to users of the freight management platform, and the data includes compliance data, load data, insurance data, carrier data, tax data, broker data, pricing data, route data, financial data, risk data, map data, documents data, and knowledge base data.

Example 42 provides the apparatus of any one of examples 31-41, in which: the user query is related to a loadboard; and the response returns one or more parameters for use in a load search API request to the loadboard.

Example 43 provides the apparatus of any one of examples 31-42, in which the conversational interface executes in a web browser of at least one of a desktop computer and a mobile device.

Example 44 provides the apparatus of any one of examples 31-42, in which the conversational interface executes in a standalone application of at least one of a desktop computer and a mobile device.

Example 45 provides the apparatus of any one of examples 31-44, further configured for: determining, by the conversational orchestrator, that the classification is related to an external API; and querying the external API for information relevant to the user query.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for implementing a conversational assistant in a freight management platform, the method comprising:
   receiving, at a conversational orchestrator in the freight management platform, a user query in natural language from a conversational interface, the user query being related to a carrier;
   passing, by the conversational orchestrator, the user query and a carrier identifier to a classifier, wherein the classifier identifies a topic to which the user query relates, the topic being one in a plurality of topics related to freight management preconfigured in the freight management platform;

responsive to the classifier identifying the topic, receiving the identified topic from the classifier at the conversational orchestrator;

responsive to receiving the identified topic, selecting, by the conversational orchestrator, a data repository from a plurality of data repositories according to the identified topic, the data repositories being classified according to the topics, different datasets in each data repository associated with different carriers;

querying, by the conversational orchestrator, the selected data repository using the carrier identifier;

retrieving, by the conversational orchestrator from the selected data repository, the respective dataset associated with the carrier identifier and the topic;

passing, by the conversational orchestrator, the retrieved dataset, the carrier identifier, and the user query to a prompt generator, wherein the prompt generator generates a prompt to a large language model (LLM), the prompt comprising instructions to answer the user query based on the retrieved dataset and respond to the user query based on a preconfigured persona and tone, wherein the LLM is trained on training data different from datasets in the data repositories;

receiving the prompt at the conversational orchestrator;

passing, by the conversational orchestrator, the prompt and the retrieved dataset to the LLM;

receiving, at the conversational orchestrator, a response in natural language from the LLM to the prompt, the response being-based on data in the retrieved dataset;

determining, by the conversational orchestrator, whether the response is to be provided in text or speech format;

responsive to determining that the response is to be provided in speech format, converting the response to speech format, and providing the response in speech format to the conversational interface;

responsive to determining that the response is to be provided in text format, providing the response in text format to the conversational interface; and retraining the LLM on the training data.

2. The method of claim 1, further comprising:

passing, by the conversational orchestrator, the user query to a carrier data repository; and retrieving, at the conversational orchestrator, the carrier identifier identifying the carrier from the carrier data repository.

3. The method of claim 1, wherein the topics comprise compliance, business metrics, onboarding, government filings, loadboard, factoring, frequently asked questions, and property management.

4. The method of claim 1, further comprising:

receiving, at the conversational orchestrator, the user query in speech format;

passing, by the conversational orchestrator, the user query to a speech-text converter; and receiving, at the conversational orchestrator, the user query in text format from the speech-text converter.

5. The method of claim 1, wherein the response is in text format, and the method further comprises:

passing, by the conversational orchestrator, the response to a speech-text converter; and receiving, at the conversational orchestrator, the response in speech format from the speech-text converter before providing the response to the conversational interface.

6. The method of claim 1, further comprising:

collating, by a prompt generator in the freight management platform, the retrieved dataset with instructions to the LLM to respond to the user query;

generating, by the prompt generator, the prompt; and sending, by the prompt generator, the prompt to the conversational orchestrator.

7. The method of claim 1, wherein:

the user query comprises a plurality of questions, the prompt includes the plurality of questions, and the response includes answers to each one in the plurality of questions.

8. The method of claim 1, wherein:

the user query is related to a loadboard; and the response returns one or more parameters for use in a load search application programming interface (API) request to the loadboard.

9. The method of claim 1, further comprising:

determining, by the conversational orchestrator, that the topic is related to an external API; and querying the external API for information relevant to the user query.

10. Non-transitory computer-readable tangible media that includes instructions for execution, which when executed by a processor of a computing device, is operable to perform operations comprising:

receiving, at a conversational orchestrator in a freight management platform, a user query in natural language from a conversational interface, the user query being related to a carrier;

passing, by the conversational orchestrator, the user query and a carrier identifier to a classifier, wherein the classifier identifies a topic to which the user query relates, the topic being one in a plurality of topics related to freight management preconfigured in the freight management platform;

responsive to the classifier identifying the topic, receiving the identified topic from the classifier at the conversational orchestrator;

responsive to receiving the identified topic, selecting, by the conversational orchestrator, a data repository from a plurality of data repositories according to the identified topic, the data repositories being classified according to the topics, different datasets in each data repository associated with different carriers;

querying, by the conversational orchestrator, the selected data repository using the carrier identifier;

retrieving, by the conversational orchestrator from the selected data repository, the respective dataset associated with the carrier identifier and the topic;

passing, by the conversational orchestrator, the retrieved dataset, the carrier identifier, and the user query to a prompt generator, wherein the prompt generator generates a prompt to a large language model (LLM), the prompt comprising instructions to answer the user query based on the retrieved dataset and respond to the user query based on a preconfigured persona and tone, wherein the LLM is trained on training data different from datasets in the data repositories;

receiving the prompt at the conversational orchestrator;

passing, by the conversational orchestrator, the prompt and the retrieved dataset to the LLM;

receiving, at the conversational orchestrator, a response in natural language from the LLM to the prompt, the response being-based on data in the retrieved dataset;

determining, by the conversational orchestrator, whether the response is to be provided in text or speech format;

responsive to determining that the response is to be provided in speech format, converting the response to speech format, and providing the response in speech format to the conversational interface;

responsive to determining that the response is to be provided in text format, providing the response in text format to the conversational interface; and retraining the LLM on the training data.

11. The non-transitory computer-readable tangible media of claim 10, wherein the topics comprise compliance, business metrics, onboarding, government filings, loadboard, factoring, frequently asked questions, and property management.

12. The non-transitory computer-readable tangible media of claim 10, the operations further comprising:

receiving, at the conversational orchestrator, the user query in speech format;

passing, by the conversational orchestrator, the user query to a speech-text converter; and receiving, at the conversational orchestrator, the user query in text format from the speech-text converter.

13. The non-transitory computer-readable tangible media of claim 10, wherein:

the response is in text format, and the operations further comprise:

passing, by the conversational orchestrator, the response to a speech-text converter; and receiving, at the conversational orchestrator, the response in speech format from the speech-text converter before providing the response to the conversational interface.

14. The non-transitory computer-readable tangible media of claim 10, the operations further comprising:

collating, by a prompt generator in the freight management platform, the retrieved dataset with instructions to the LLM to respond to the user query;

generating, by the prompt generator, the prompt; and sending, by the prompt generator, the prompt to the conversational orchestrator.

15. The non-transitory computer-readable tangible media of claim 10, wherein:

the user query is related to a loadboard; and the response returns one or more parameters for use in a load search API request to the loadboard.

16. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

receiving, at a conversational orchestrator in a freight management platform, a user query in natural language from a conversational interface, the user query being related to a carrier;

passing, by the conversational orchestrator, the user query and a carrier identifier to a classifier, wherein the classifier identifies a topic to which the user query relates, the topic being one in a plurality of topics related to freight management preconfigured in the freight management platform;

responsive to the classifier identifying the topic, receiving the identified topic from the classifier at the conversational orchestrator;

responsive to receiving the identified topic, selecting, by the conversational orchestrator, a data repository from a plurality of data repositories according to the identified topic, the data repositories being classified according to the topics, different datasets in each data repository associated with different carriers;

querying, by the conversational orchestrator, the selected data repository using the carrier identifier;

retrieving, by the conversational orchestrator from the selected data repository, the respective dataset associated with the carrier identifier and the topic;

passing, by the conversational orchestrator, the retrieved dataset, the carrier identifier, and the user query to a prompt generator, wherein the prompt generator generates a prompt to a large language model (LLM), the prompt comprising instructions to answer the user query based on the retrieved dataset and respond to the user query based on a preconfigured persona and tone, wherein the LLM is trained on training data different from datasets in the data repositories;

receiving the prompt at the conversational orchestrator;

passing, by the conversational orchestrator, the prompt and the retrieved dataset to the LLM;

receiving, at the conversational orchestrator, a response in natural language from the LLM to the prompt, the response being-based on data in the retrieved dataset;

determining, by the conversational orchestrator, whether the response is to be provided in text or speech format;

responsive to determining that the response is to be provided in speech format, converting the response to speech format, and providing the response in speech format to the conversational interface;

responsive to determining that the response is to be provided in text format, providing the response in text format to the conversational interface; and retraining the LLM on the training data.

17. The apparatus of claim 16, further configured for:

passing, by the conversational orchestrator, the user query to a carrier data repository; and retrieving, at the conversational orchestrator, the carrier identifier identifying the carrier from the carrier data repository.

18. The apparatus of claim 16, wherein the topics comprise compliance, business metrics, onboarding, government filings, loadboard, factoring, frequently asked questions, and property management.

19. The apparatus of claim 16, further configured for:

collating, by a prompt generator in the freight management platform, the retrieved dataset with instructions to the LLM to respond to the user query;

generating, by the prompt generator, the prompt; and sending, by the prompt generator, the prompt to the conversational orchestrator.

20. The apparatus of claim 16, wherein:

the user query is related to a loadboard; and the response returns one or more parameters for use in a load search API request to the loadboard.

\* \* \* \* \*